Aug. 3, 1948. W. R. CURTIS 2,446,362
BED COVER HOLDER
Filed March 31, 1944 3 Sheets-Sheet 1

INVENTOR.
Wilbur R. Curtis
BY
Victor J. Evans & Co.
ATTORNEYS

Aug. 3, 1948. W. R. CURTIS 2,446,362
BED COVER HOLDER
Filed March 31, 1944 3 Sheets-Sheet 2
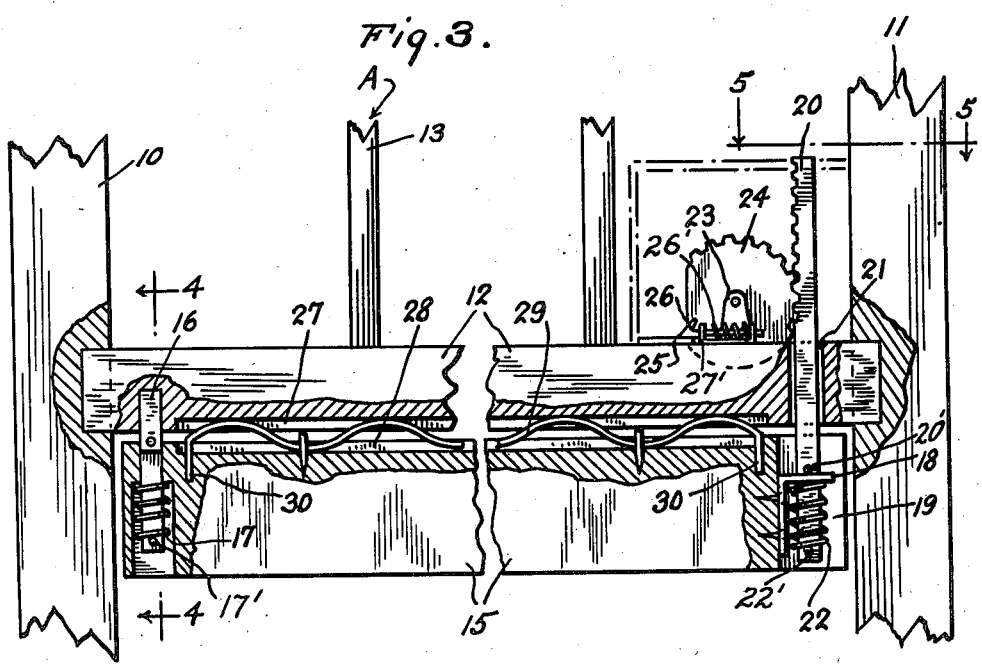
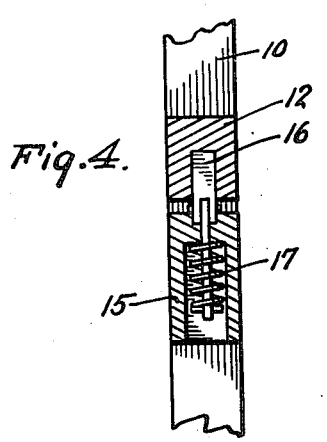
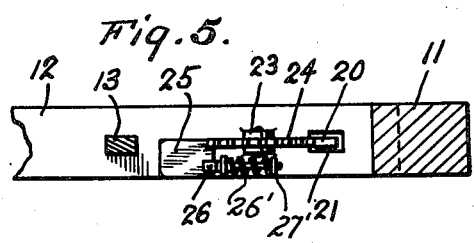
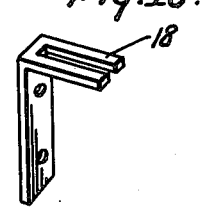
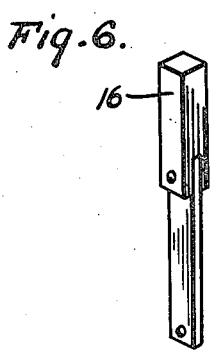
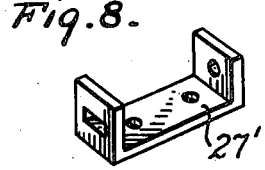
INVENTOR.
Wilbur R. Curtis
BY
Victor J. Evans & Co.
ATTORNEYS Aug. 3, 1948. W. R. CURTIS 2,446,362
BED COVER HOLDER
Filed March 31, 1944 3 Sheets-Sheet 3
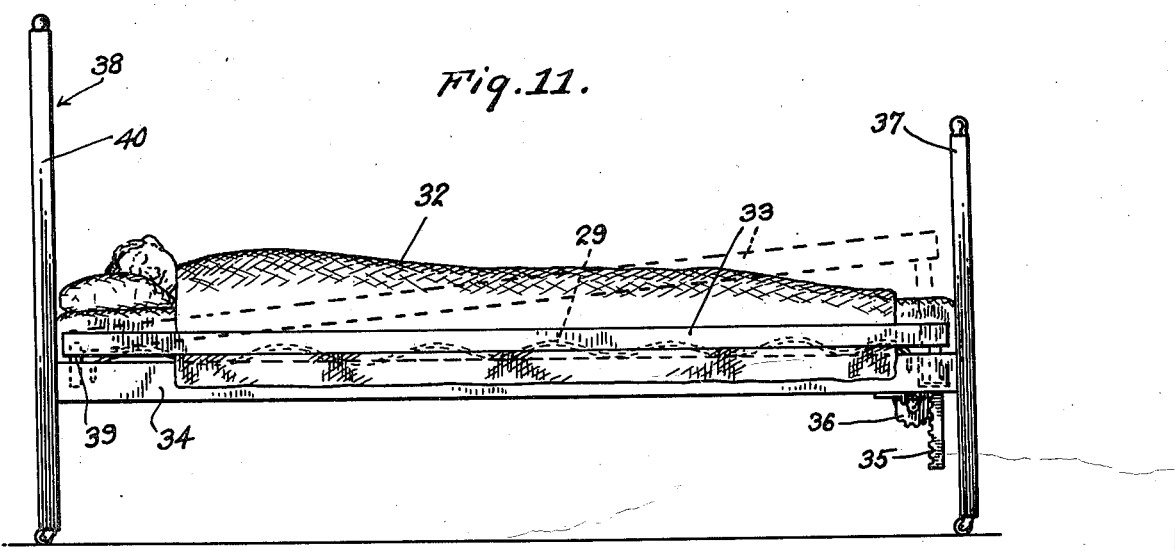
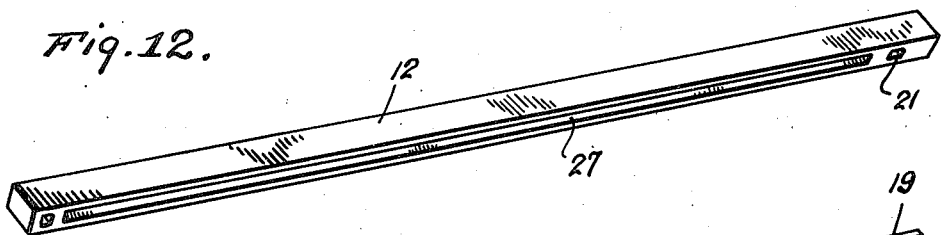
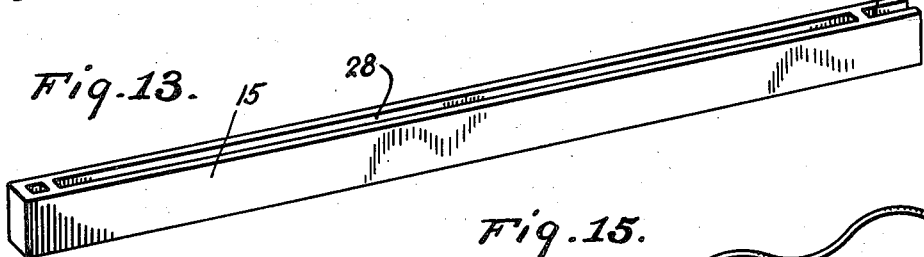
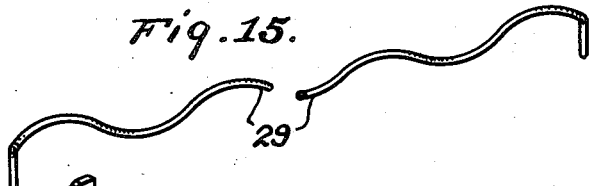
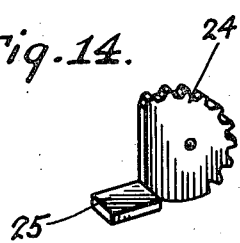
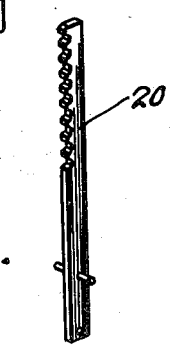
INVENTOR.
Wilbur R. Curtis
BY
Victor J. Evans & Co.
ATTORNEYS Patented Aug. 3, 1948

2,446,362

UNITED STATES PATENT OFFICE 2,446,362

BED COVER HOLDER

Wilbur R. Curtis, Fresno, Calif.

Application March 31, 1944, Serial No. 528,965

2 Claims. (Cl. 5—320)

The invention relates to a bed construction, and more especially to a bed attachment for coverings therefor.

The primary object of the invention is the provision of an attachment of this character, wherein the same is adapted to be built into a bed or crib, so that the coverings therefor can be readily and conveniently held in place, to avoid being disturbed by the occupant, and in this manner eliminating the working of the coverings off such occupant unintentionally while within the bed.

Another object of the invention is the provision of an attachment of this character, wherein the same can be readily and easily operated for securing the covering in place and for the release thereof, as may be required, the said attachment being self-adjustable, so as to firmly hold the clothing or covering, irrespective of variance in the thicknesses thereof at different areas thereof in the spread of the same over the bed.

A further object of the invention is the provision of an attachment of this character, wherein through the use thereof, it will not damage the clothing or coverings, and will assure the retention thereof in a neat and orderly arrangement upon the bed, as well as maintaining the occupant fully protected against exposure.

A still further object of the invention is the provision of an attachment of this character, which is simple in construction, thoroughly reliable and efficient in operation, strong and durable, thus requiring minimum alterations in the construction of the bed or crib when installing such attachment. The invention is also novel in construction and arrangement, without detracting from the normal appearance of such bed or crib, and inexpensive to manufacture and install.

With these and other objects in view, the invention consists in the features of construction, combination and arrangement of parts as will be hereinafter more fully described, illustrated in the accompanying drawings, which show the preferred and modified forms of construction of the invention, and pointed out in the claims hereunto appended.

In the accompanying drawings:

Figure 3 is a fragmentary enlarged side elevation, partly broken away, showing details of such attachment.

Figure 4 is a sectional view taken on the line 4—4 of Figure 3 looking in the direction of the arrows.

Figure 5 is a sectional view taken on the line 5—5 of Figure 3 looking in the direction of the arrows.

Figure 6 is a perspective view of one of the hinge hangers of the attachment.

Figure 7 is a perspective view of a gear latch used with the attachment.

Figure 8 is a perspective view of the bracket for the latch shown in Figure 7.

Figure 9 is a perspective view of the latch spring.

Figure 10 is a perspective view of the rack bar fitting.

Figure 11 is a side view of a modified form of the attachment in use with a bed.

Figure 12 is a perspective view of one of the clamping rails of this modified form shown in Figure 11.

Figure 13 is a perspective view of one side rail of the bed shown in Figure 11.

Figure 14 is a perspective view of the rack gear shown in Figure 11.

Figure 15 is a perspective view of the self-adjusting gripper wire of the attachment.

Figure 16 is a perspective view of the rack bar.

Similar reference characters indicate corresponding parts throughout the several views in the drawings.

Figure 1:
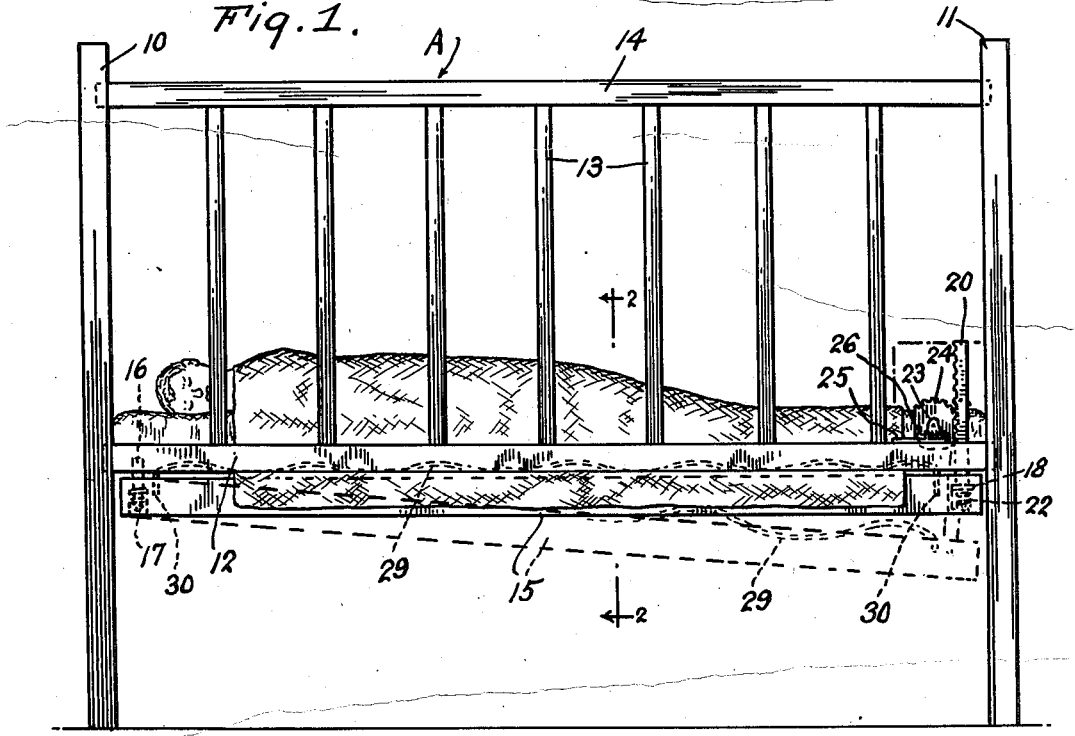
Figure 1 is a side elevation of a crib showing the attachment constructed in accordance with the invention applied, and by full lines the attachment is shown in position for holding the coverings, while by dotted lines, it is shown in releasing position.
Figure 2:
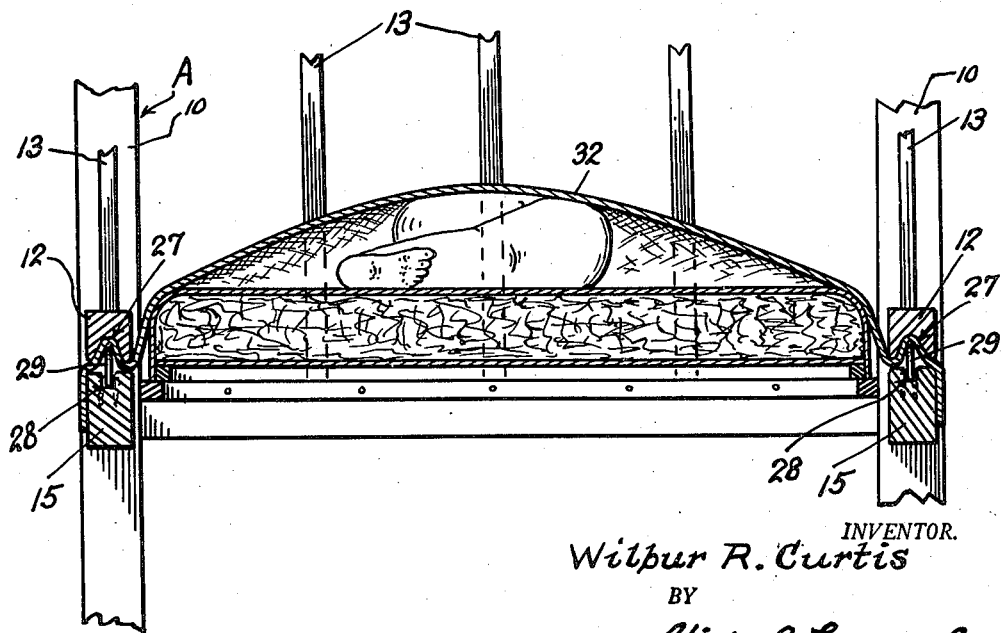
Figure 2 is a sectional view taken on the line 2—2 of Figure 1 looking in the direction of the arrows.

Referring to the drawings in detail, particularly Figures 1 to 10, respectively, A designates generally an infant's crib, which is of any standard construction, having vertical head and foot sections 10 and 11, respectively, these being joined at each side to a lower side rail 12 from which rises a slatted guard section 13, its top rail 14 having connection with the head and foot sections, as usual. Each guard section 13 may be of the fixed type or of the drop kind.

Immediately beneath each side rail 12 and coextensive therewith in a longitudinal direction is a vertically tilting clamp bar 15, which at the end thereof next to the head section 10 is supported by a hinge-jointed hanger 16, the innermost portion of which is securely doweled in the rail 12, while the outermost portion is yieldably fitted in the bar by the association of a coiled tensioning spring 17, the latter being held in the said hanger by a pin 17' and acts against the said bar, as is clearly shown in Figure 3 of the drawings.

The other end of the bar 15 has fitted thereto an inverted substantially L-shaped fitting 18, it being accommodated in a clearance 19 therefor in said bar, and coupled with this fitting 18 is a vertically disposed toothed rack member 20, which slidably engages in a guideway 21 in the rail 12, the member 20 being equipped with a tensioning spring 22 active upon the bar 15. The rack member 20 is provided with upper and lower pins 20' and 22'. The upper pin 20' limits the downward movement of the member 20. The lower pin 22' retains the spring 22 on the member 20. The spring 22 by reacting against the fitting 18 and the pin 22' provides a yieldable connection for obtaining flexibility of operation and for absorbing any play that may occur between the rack member 20 and the fitting 18. On the rail 12 next to the rack member 20 is a bearing 23 rotatably supporting a rack gear 24, which has its teeth meshing with the teeth of the said member 20, so that by rotating the said gear the latter can be moved for shifting the bar 15 to clamping or unclamping positions with relation to the rail 12, these positions being effected through the medium of the hinge-jointed hanger 16, and such bar 15 is urged in close relationship to the rail 12 by the tensioning springs 17 and 22 countering any resisting pressure against the said bar.

At the periphery of the gear 24 in proper location thereon is a combined actuator wing and keeper 25 which enables the manual turning of such gear, as well as the latching thereof in a fixed position by a hand released locking bolt 26 tensioned by a spring 26' coiled about the bolt 26 for forcing the same and thereby the keeper 25 toward the gear 24, slidably supported in a mounting 27' on the rail 12. The gear 24 is latched in a fixed position by this bolt 26, when such gear has moved the rack member 20 to bring the bar 15 into a clamping position relative to the rail 12, as is shown in Figure 3 of the drawings.

Provided in the confronting faces of the rail 12 and bar 15 are co-extensive companion channels or grooves 27 and 28, respectively, the former being an ogee form of channel or groove, and the latter a substantially rectangular shaped groove or channel, and are adapted to register with each other. Seated within the channel or groove 28 and adapted to interfit the groove or channel 27 is an inherently springy weltered shaped gripping wire 29, having its ends anchored at 30 in the bar 15, the wire 29 being full length with the grooves or channels. The wires 29 at opposite sides of the crib A resiliently grip the clothing or coverings when the latter are placed between the side rails 12 and bars 15, and the latter are brought to clamping position with relation to the said rails 12. In this manner the clothing or coverings will be firmly and securely held over an occupant of the crib, without any chance of the accidental working of the said clothing or coverings from such occupant within the crib.

The resiliency of the wires 29, and the tensioning qualities of the springs 17 and 22 assure the firm gripping of the clothing or coverings 32, without respect to any variance in thicknesses at different areas thereof in the spread or lay thereof when worn by the crib.

In Figures 11 to 16 of the drawings there is shown a slight modification of the invention, wherein each clamping bar 33 is arranged above the side rail 34, while the toothed rack member 35 depends therefrom through the side rail to engage with the rack gear 36, which is fitted to the under side of the said rail 34 next thereto, the member 35 being at one end of the bar adjacent to the foot section 37 of a bed 38, while the hinge-jointed hanger 39 is at the other end of the bar 33 next to the head section 40 of such bed. The bed 38 is devoid of side guards, in that it is to be used by grown-up occupants. In this modified form of construction, the tensioning springs heretofore set forth are dispensed with, and the gripping wires associated therewith.

What is claimed is:

1. The combination with a bed having stationary side rails, clamping bars, means yieldingly pivoting one end of each bar to a corresponding side rail, toothed rack members, means securing one of the toothed rack members to the other end of each of the clamping bars, a toothed gear, means pivotally mounting the toothed gear on each side rail and meshing with each rack member, and locking means mounted on each side rail and engaging the toothed gear thereon for locking the gear against rotation thereof.

2. In a bed, a stationary side bar provided with a groove lengthwise thereof, a clamping bar provided with a groove lengthwise thereof, a resilient undulated wire member anchored in said clamping bar groove and adapted to fit into said stationary side bar groove, a link pivotally secured to one of said bars and slidable through the other of said bars, resilient means between said link and the bar through which it is slidable, whereby one of said bars may be moved relatively to the other of said bars, a rack means pivotally secured to one of said bars and extending through the other of said bars, a pinion, mounting means for rotatably supporting the pinion on the bar through which the rack means extends, said mounting means holding said pinion in meshing engagement with said rack means whereby rotation of said pinion will cause swinging movement of one bar relative to the other and locking means mounted on said side bar and engaging said pinion for locking the pinion against rotation thereof.

WILBUR R. CURTIS.

REFERENCES CITED

The following references are of record in the file of this patent:

UNITED STATES PATENTS

| Number | Name | Date |
|---|---|---|
| 87,742 | Whitner | Mar. 9, 1869 |
| 323,265 | Bohaker | July 28, 1885 |
| 352,497 | Street et al. | Nov. 9, 1886 |
| 494,560 | Floyd | Apr. 4, 1893 |
| 552,253 | Maher | Dec. 31, 1895 |
| 751,010 | Pyle | Feb. 2, 1904 |
| 811,492 | Fair | Jan. 30, 1906 |
| 864,291 | Carpenter | Aug. 27, 1907 |
| 974,747 | Carr | Nov. 1, 1910 |
| 1,227,399 | DeWendt | May 22, 1917 |
| 1,659,519 | Dilatush | Feb. 14, 1928 |
| 1,900,478 | Zimmerman | Mar. 7, 1933 |
| 2,130,268 | Craddock | Sept. 13, 1938 |